United States Patent

Ishida et al.

[11] Patent Number: 6,031,235
[45] Date of Patent: Feb. 29, 2000

[54] ULTRA-HIGH VACUUM APPARATUS

[75] Inventors: Yasuhiko Ishida; Minoru Hiroki, both of Katsuta; Toshiaki Kobari, Chiyoda-machi; Osamu Satou, Hitachi; Yasushi Nakaizumi, Katsuta; Akimitsu Okura, Katsuta; Hideiti Kimura, Katsuta, all of Japan

[73] Assignee: Hitachi, Ltd., Tokyo, Japan

[21] Appl. No.: 09/339,300

[22] Filed: Jun. 24, 1999

Related U.S. Application Data

[62] Division of application No. 08/723,952, Sep. 26, 1996, abandoned, which is a continuation of application No. 08/389,448, Feb. 16, 1995, abandoned, which is a continuation of application No. 08/096,582, Jul. 22, 1993, abandoned.

[30] Foreign Application Priority Data

Jul. 28, 1992 [JP] Japan ................................. 4-219587

[51] Int. Cl.⁷ ................................................... G01N 23/00
[52] U.S. Cl. ..................................... 250/441.11; 251/368
[58] Field of Search .............................. 250/311, 441.11, 250/442.11; 251/368

[56] References Cited

U.S. PATENT DOCUMENTS

| | | |
|---|---|---|
| 4,889,319 | 12/1989 | Phillips et al. ........................... 251/368 |
| 5,124,397 | 6/1992 | Kanazawa et al. ...................... 524/496 |
| 5,170,990 | 12/1992 | Kamiya ................................... 251/210 |

FOREIGN PATENT DOCUMENTS

| | | |
|---|---|---|
| 1 904 186 | 8/1970 | Germany . |
| 3-61685 | 3/1991 | Japan . |
| WO91/08412 | 6/1991 | Japan . |
| 3-153970 | 7/1991 | Japan . |
| 3-234973 | 10/1991 | Japan . |
| 1 242 036 | 8/1971 | United Kingdom . |

OTHER PUBLICATIONS

Polymer Handbook, Third Edition, p. V–42, Brandrup et al.; John Wiley & Sons, N.Y.

*Primary Examiner*—John Fox
*Attorney, Agent, or Firm*—Kenyon & Kenyon

[57] ABSTRACT

A vacuum container is evacuated to be kept at an ultra-high vacuum. Valve means is provided for connecting and disconnecting the inside of the vacuum container with and from the outside thereof, and includes a vacuum-tight seal made of a high polymer having a water absorptivity of 0.1% and less and an outgassing rate of $2 \times 10^{-6}$ (Torr·l/sec/cm$^2$:at 200° C.) and less.

24 Claims, 3 Drawing Sheets

ULTRA-HIGH VACUUM APPARATUS

This application is a divisional of U.S. patent application Ser. No. 08/723,952, filed Sep. 26, 1996, which is a continuation of U.S. patent application Ser. No. 08/389,448, filed Feb. 16, 1995, which is a continuation of U.S. patent application Ser. No. 08/096,582, filed Jul. 22, 1993, all now abandoned, the entirety of which is incorporated herein by reference.

BACKGROUND OF THE INVENTION

The present invention relates to an ultra-high vacuum apparatus, and more particularly to an ultra-high vacuum apparatus suited for use in a field emission type scanning electron microscope.

In a scanning electron microscope, a field emission type electron gun is generally used rather than a thermionic emission type electron gun in order to obtain an electron beam with which a sample or specimen is irradiated. This is because an electron current density in the field emission is remarkably higher than that in the thermionic emission and the diameter of an electron beam source is extremely smaller in the field emission than in the thermionic emission. However, an ultra-high vacuum is required for obtaining a stable field emission current. Though a degree of vacuum of $10^{-7}$ Torr and less is generally called an ultra-high vacuum, an ultra-high vacuum of $10^{-9}$ Torr and less, and typically $10^{-9}$ Torr to $10^{-10}$ Torr, is indispensable for obtaining a stable field emission current.

According to a field emission type scanning electron microscope, an electron gun chamber in which a field emission gun is arranged is evacuated by a vacuum pump such as a rotary pump through a specimen chamber in which a specimen is disposed and then is continued to be evacuated by a vacuum pump such as an ion pump. The electron gun chamber is maintained at an ultra-high vacuum of the order of $10^{-9}$ Torr to $10^{-10}$ Torr, while the specimen chamber is kept at $10^{-8}$ Torr and more, and typically $10^{-5}$ Torr to $10^{-6}$ Torr.

When the specimen is exchanged, the specimen chamber is made open to the atmosphere to replace the old specimen by a new one. In this case, it is desirable to isolate the electron gun chamber from the specimen chamber in vacuum continuum to prevent the electron gun chamber from being vacuum-broken. Therefore, a valve means is provided for connecting and disconnecting the electron gun chamber with and from the specimen chamber each time the specimen is exchanged. The valve means comprises a vacuum-tight seal, an opening for communicating the electron gun chamber and the specimen chamber with each other, and a manipulator for bringing the vacuum-tight seal into close contact with an end surface of the opening so as to close the same and for releasing the close contact between the vacuum-tight seal and the opening end surface so as to open the opening. Walls of the electron gun chamber and the specimen chamber are made of a metal such as stainless steel, including a member forming the opening. The vacuum-tight seal, however, is generally made of a material other than a metal to maintain the close contact between the vacuum-tight seal and the opening end surface even where the opening is closed and opened repeatedly.

On the other hand, in advance of assembling an ultra-high vacuum apparatus, components thereof are individually baked, including the vacuum-tight seal. The apparatus is assembled with the baked components and then further baked in advance of formal specimen observations. The baking treatment is normally carried out at a high temperature of about 250° C. to 400° C. for outgassing, i.e. degassing the surface of the apparatus exposed to the vacuum atmosphere therein. Thus, the vacuum-tight seal should be made of a material resisting such a high temperature.

In view of the foregoing, the vacuum-tight seal is generally made of polyimide or fluorocarbon polymer. Examples employing these materials for a vacuum-tight seal are disclosed in Japanese laid-open Patent Document Nos. 153970/1991 and 234973/1991.

However, the outgassing of polyimide or fluorocarbon polymer is larger than the outgassing of other structural materials of the ultra-high vacuum apparatus such as metallic materials like stainless steel. Comparing outgassing rate (Torr·l/sec/cm² at 200° C.) under an identical condition, it is known that the outgassing rate of polyimide is approximately 1000 times as large as that of stainless steel. Therefore, employing polyimide for a vacuum-tight seal increases the baking time and the ultimate pressure.

SUMMARY OF THE INVENTION

The present invention provides an ultra-high vacuum apparatus which is capable of shortening a baking time for outgassing treatment.

The present invention also provides an ultra-high vacuum apparatus which is capable of lowering an ultimate pressure.

The present invention additionally relates to an ultra-high vacuum apparatus which is capable of shortening a baking time for outgassing treatment and lowering an ultimate pressure.

According to an aspect of the present invention, an ultra-high vacuum apparatus is provided which comprises a vacuum container, means for evacuating the vacuum container so as to maintain the inside thereof at an ultra-high vacuum, and valve means for connecting and disconnecting the inside of the vacuum container with and from the outside thereof, the valve means including a vacuum-tight seal made of a high molecular weight polymer having a water absorptivity of 0.1% and less and/or an outgassing rate of $2 \times 10^{-6}$ (Torr·l/sec/cm²: at 200° C.) and less other than flurocarbon resin.

According to another aspect of the present invention, a vacuum-tight seal for use in an ultra-high vacuum is provided which is made of a high molecular weight polymer having a water absorptivity of 0.1% and less and/or an outgassing of $2 \times 10^{-6}$ (Torr·l/sec/cm²: at 200° C.) and less other than flurocarbon resin.

The foregoing and other objects, features and advantages of the present invention will become apparent from the description of preferred embodiments of the present invention in conjunction with the accompanying drawings.

DETAILED DESCRIPTION

Figure 1:
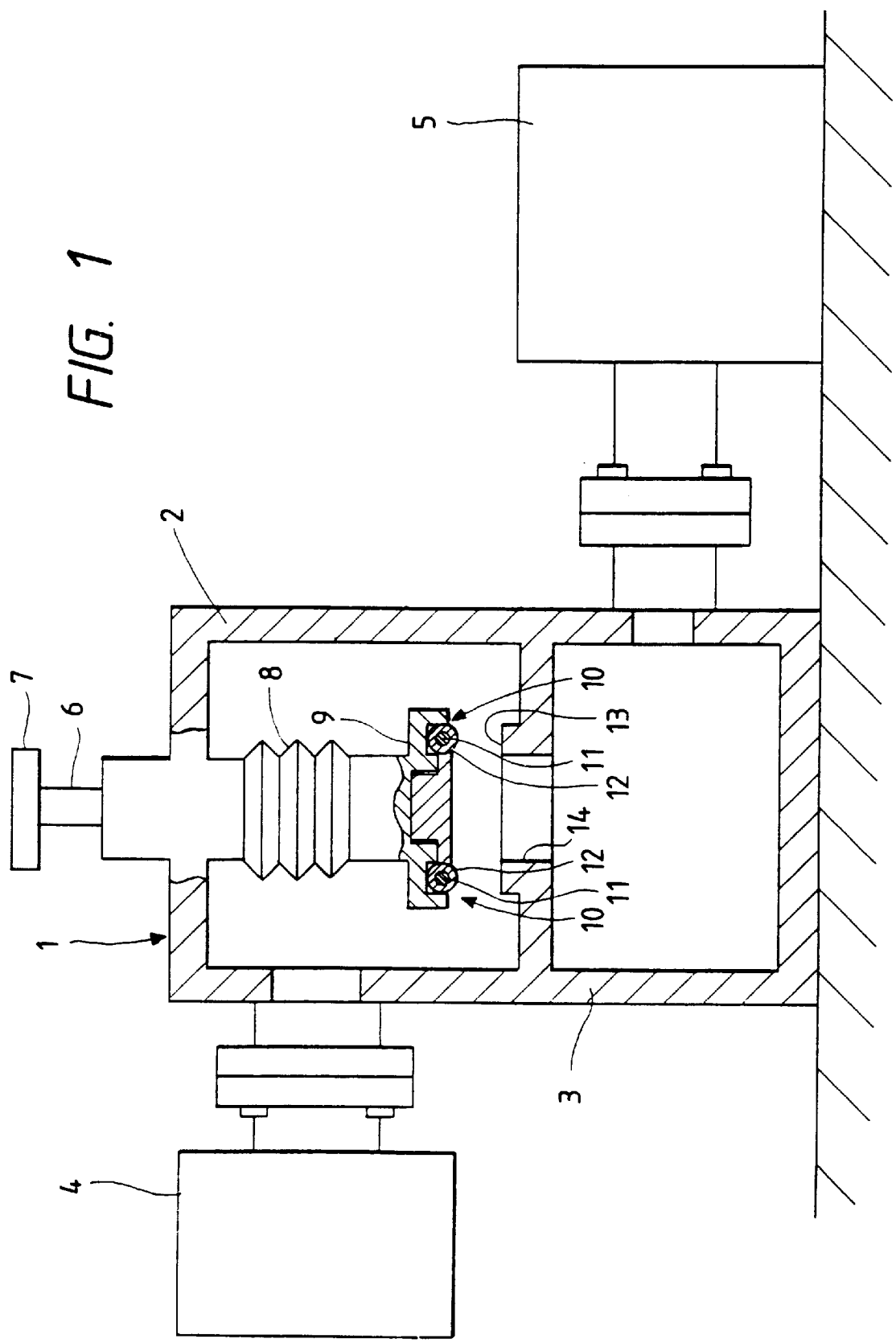
FIG. 1 is a schematic pictorial view, partly in section, of an ultra-high vacuum apparatus showing an embodiment according to the present invention.

Referring to FIG. 1, a vacuum container 1 is constituted by a first vacuum container 2 to which a vacuum pump such as an ion pump 4 is connected and a second vacuum container 3 to which a vacuum pump 5 such as a rotary pump is connected, the first and second vacuum containers 2 and 3 being communicated with each other through an opening 14 of a wall partitioning the vacuum container 1 into the first and second vacuum containers 2 and 3. Valve means is provided which comprises a rod 6 being in threaded-engagement with the upper wall of the first vacuum container 2 so as to extend from the outside of the first vacuum container 2 to the inside thereof, a handle 7 secured at one end of the rod 6, a valve body 9 secured at the other end of the rod 6, a bellows 8 fixed between the valve body 9 and the upper wall of the first vacuum container 2 in a vacuum-tight manner, and a vacuum-tight seal 10 mounted on the lower end surface of the valve body 9 with a stopper screwed into the lower end of the valve body 9 at the central portion thereof. The bellows 8 serves to convert rotation of the handle 7 and hence the rod 6 into rectilinear motion of the valve body 9 in an axial direction of the rod 6 while preventing the valve body 9 from rotating, whereby the vacuum-tight seal 10 is brought into close contact with an end surface 13 of the opening 14 which functions as a valve seat and released from the close contact with the valve seat 13 so as to close and open the opening 14. The vacuum-tight seal 10 is of a ring shape and is provided with a substrate having a circular section and a coat formed thereon. The substrate may be made of a metal or high molecular weight polymer resisting a high temperature of about 250° C. and more, while the coat is made of a high molecular weight polymer as described below in detail. The whole vacuum-tight seal 10 may be made of a high molecular weight polymer as described below in detail without being divided into the substrate 11 and the coat 12 as shown in FIG. 1.

When the opening is opened, the insides of the first and second vacuum containers 2 and 3 are evacuated by the vacuum pump 5. When the insides of both the vacuum containers reach a predetermined degree of vacuum, the first vacuum container 2 is evacuated by the vacuum pump 4 in addition to the vacuum pump 5 so that the first vacuum container 2 is kept at an ultra-high vacuum and the second vacuum container 3 is kept at a degree of vacuum lower than the first vacuum container 2. The first vacuum container 2 may be an electron gun chamber in which an electron gun of field emission type is arranged, while the second vacuum container 3 may be a specimen chamber in which a specimen to be irradiated with a field-emitted electron beam is disposed for scanning electron microscopic observations. In this case, the inside of the first vacuum container 2 is maintained at a degree of vacuum of the order of $10^{-9}$ Torr to $10^{-10}$ Torr, while the second vacuum container 3 is maintained at a degree of vacuum of $10^{-8}$ Torr and more, and typically $10^{-5}$ Torr to $10^{-6}$ Torr.

If the second vacuum container 3 is made open to the atmosphere after the opening 14 is closed, the observed specimen can be exchanged for a new one. After the completion of the specimen exchange, the second vacuum container 3 is closed and then evacuated. When the inside of the second vacuum container 3 has then been maintained at the original degree of vacuum, the opening 14 is opened. A specimen exchanging device is omitted in FIG. 1 because it is well known. A scanning electron microscope of field emission type is well known and thus it is also not illustrated in FIG. 1.

The inventors have found through their experimental study the fact that, if the whole vacuum-tight seal or the coat thereof is made of a high molecular weight polymer having a high polymer having a water absorptivity of 0.1% and less and/or an outgassing of $2 \times 10^{-6}$ (Torr·l/sec/cm$^2$: at 200° C.) and less, an ultimate pressure can be lowered and a time to achieve the ultimate pressure can be shortened. In addition, it has also been confirmed that, taking thermal resistivity, workability and durability into consideration, totally-aromatic-liquid-crystal-polyester is especially effective for the foregoing high molecular weight polymer.

Totally-aromatic-liquid-crystal-polyester is on the market as the trade name "EKONOL®" from Sumitomo Chemicals Co. and the trade name "XYDAR™" from Nippon Petrochemical Co., and has the following molecular structure formula:

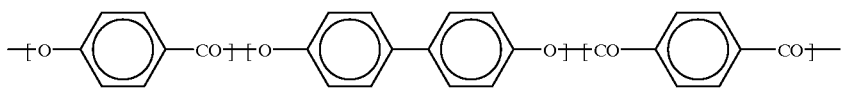

Such a substance is also disclosed in Japanese laid-open Patent Document No. 61685/1991 titled "A seal member for use in scroll type compressors or vacuum pumps".

Turning again to FIG. 1, the ultimate pressure P in the vacuum container 2 is expressed by the following equation, where S is the total pumping speed of the vacuum pumps 4 and 5, Q1 is an outgassing rate from the surface of the vacuum-tight seal 10 exposed to the vacuum, and Q2 is the total outgassing rate from the surfaces exposed to the vacuum other than the surface of the vacuum-tight seal 10, respectively:

$$P = (Q1 + Q2)/S \qquad (1)$$

Therein, total outgassing rate Q2 is negligible when the vacuum chambers 11, 12, etc. are sufficiently outgassed by baking treatment. Consequently, the ultimate pressure P is proportional to the outgassing rate Q1 of the vacuum-tight seal 10.

Figure 2:
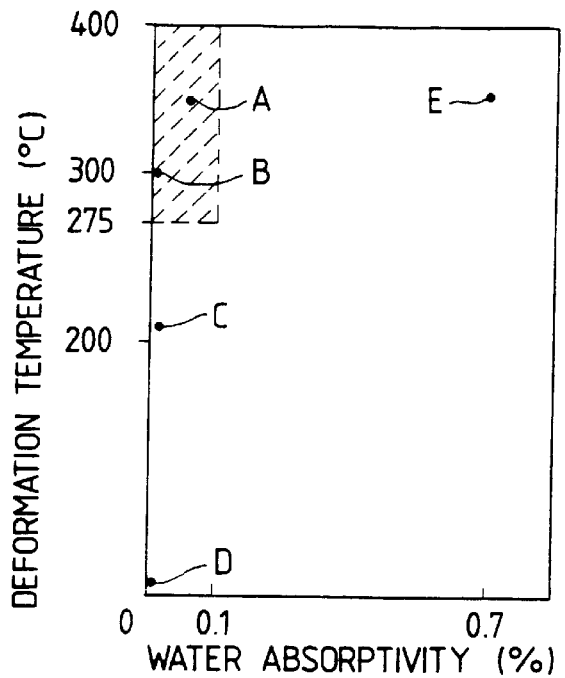
FIG. 2. is a graph showing a relationship between thermal deformation temperatures and water absorptivities for various vacuum-tight seal materials.

FIG. 2 is a graph showing a relationship between thermal deformation temperatures and water absorptivities of various vacuum-tight seal materials, i.e. sealants, wherein both the letters A and B indicate the EKONOL and the XYDAR, respectively, the letter C fluorocarbon resin containing filler, the letter D fluorocarbon resin without filler, and the letter E polyimide.

It is understood that the fluorine-contained resin is of low water absorptivity and is effective for a sealant unless the thermal deformation temperature is considered.

Considering thermal deformation temperatures (the test method thereof is of ASTM D648-82), the fluorine-contained resin may be excluded from the promising sealant, and the totally-aromatic-liquid-crystal-polyester may be suitable for the ultra-high vacuum sealant. Further, the totally-aromatic-liquid-crystal-polyester has a low water absorptivity (less than 0.1%) as compared with the polyimide E (0.7%), and is confirmed to be effective for the ultra-high vacuum sealant.

The water absorptivity is measured after 24 hours of immersing the sealant into distilled water held at 23° C. as prescribed by ASTM D570. It is desirable that the thus measured water absorptivity is kept substantially unchanged after being measured. Totally-aromatic-liquid-crystal-polymer is advantageous in that the absorptivity thereof is substantially stable after being measured.

Figure 3:
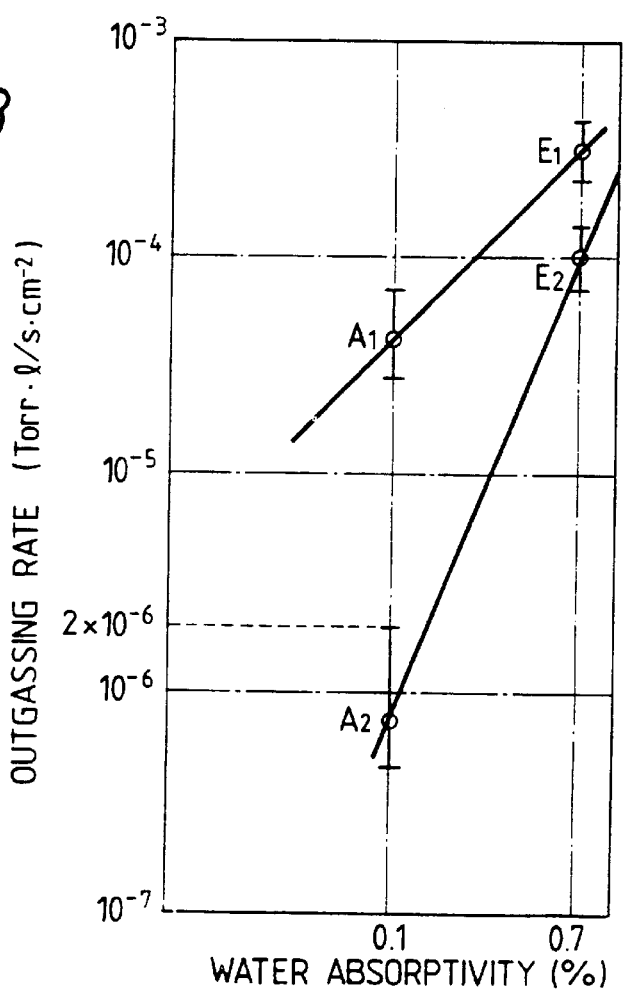
FIG. 3 is a graph showing a relationship between water absorptivities and outgassing rates for various vacuum-tight seal materials.

FIG. 3 is a graph showing a relationship between water absorptivities and outgassing rates of sealants, wherein the letters E1 and A1 indicate the outgassing rates of polyimide (water absorptivity is 0.7%) and totally-aromatic-liquid-crystal-polyester (water absorptivity is less than 0.1%) used for sealants respectively in an initial, or first, baking treatments for outgassing at a temperature of 200° C., and the letters E2 and A2 indicate the outgassing rates of polyamide and totally-aromatic-liquid-crystal-polyester respectively at a temperature of 200° C. in the successive, or second, baking treatments after the initial baking followed by breaking the vacuum to the atmospheric pressure.

It is apparent from FIG. 3 that the reductions in outgassing rates in the second baking treatments relative to those in the first depend on water absorptivities and that the magnitude of reduction in outgassing rate in the second baking treatment for totally-aromatic-liquid-crystal-polyester (approximately $2 \times 10^{-6}$ Torr·l/cm$^2$: at 200° C.), which has a low water absorptivity, is larger than the amount of reduction for polyimide which has a high water absorptivity.

This means that performing baking treatments with the components of an apparatus apiece in advance and re-baking treatment with the apparatus after assembling thereof substantially reduces the baking treatment time at the time of operating the apparatus; and that applying the sealant in accordance with the present invention to an ultra-high vacuum apparatus such as field emission type electron microscopes substantially improves operating efficiency thereof.

The inside of the column of a field emission type electron microscope is classified into sections by vacuum levels for the purpose of use and a plurality of ultra-high-vacuum valves for pre-pumping are provided to attain each level of vacuum pressures. Therefore, introduction of the sealant in accordance with the present invention to the ultra-high vacuum valves improves working efficiency in baking outgassing treatments.

Figure 4:
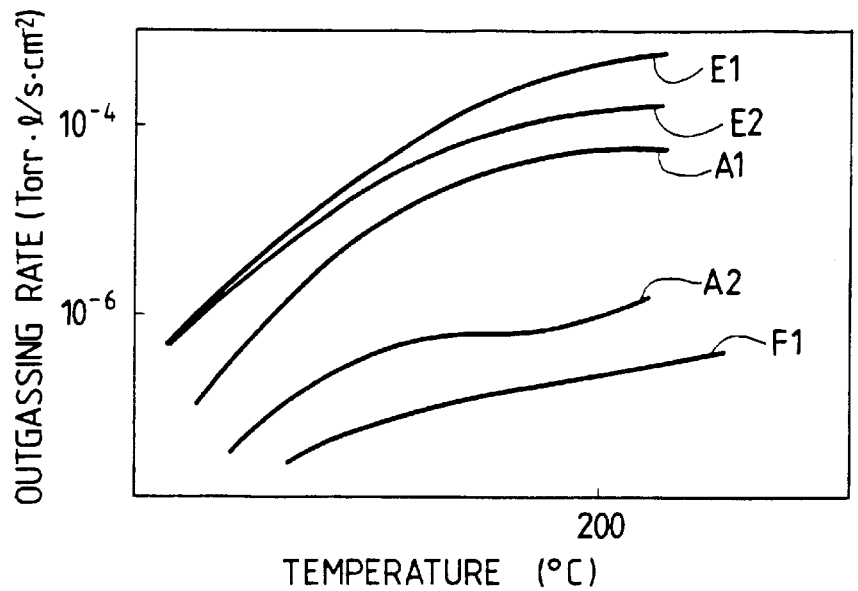
FIG. 4 is a graph showing a relationship between temperatures and outgassing rates for various vacuum-tight seal materials.

FIG. 4 is a graph showing a relationship between temperatures and outgassing rates for various kinds of vacuum sealants, wherein the letters E1, F1, A1 indicate outgassing rates of polyimide, stainless steal, totally-aromatic-liquid-crystal-polyester, respectively, used for sealants in the initial baking treatments, and the letters E2 and A2 indicate outgassing rates of polyimide and totally-aromatic-liquid-crystal-polyester respectively used for sealants in the successive, or second, baking treatments after the initial baking treatments followed by breaking a vacuum condition to the atmospheric pressure. According to FIG. 4, the outgassing rates of totally-aromatic-liquid-crystal-polyester in the second baking treatment show substantially the same values as the outgassing rates of stainless steel.

Figure 5:
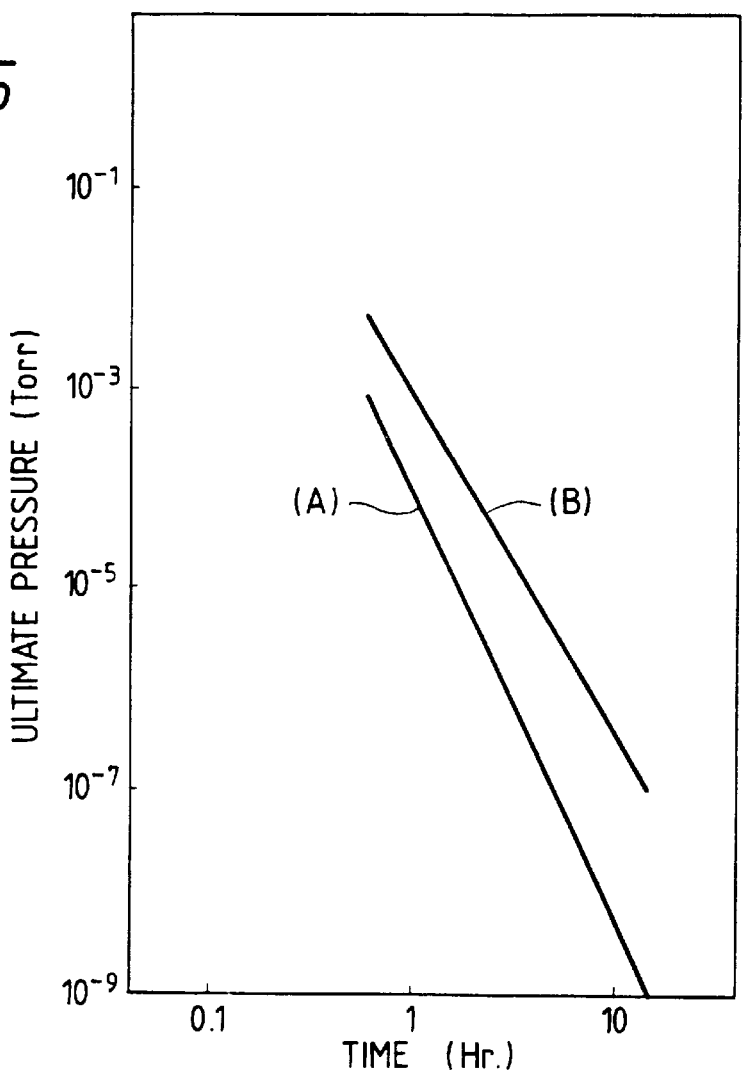
FIG. 5 is a graph comparing ultimate vacuums for vacuum-tight seal materials having different water absorptivities.

FIG. 5 is a graph showing a comparison of ultimate vacuums obtained by substituting the outgassing rate for polyimide (B) or totally-aromatic-liquid-crystal-polyester (A) into the equation (1) described above, wherein both the ultimate pressure and the time to achieve ultra-high vacuum for totally-aromatic-liquid-crystal-polyester, having a low water absorptivity, are smaller than those for polyimide, and showing that employing totally-aromatic-liquid-crystal-polyester as sealants may shorten the baking treatment time for outgassing.

According to the embodiments of the present invention, as described above, the following advantageous effects are obtained:

(1) Baking treatment time can be shortened since the outgassing, or outgassing rate, of the sealant in accordance with the present invention is small.

(2) The time to achieve an ultra-high-vacuum in operating an apparatus can substantially be reduced when baking treatments are performed with components thereof apiece in advance and again after assembling thereof.

(3) An availability factor of an ultra-high-vacuum apparatus can substantially be improved since the baking treatment time to recover an ultra-high-vacuum condition after breaking a vacuum to the atmosphere pressure for changing specimens or the like is shortened by approximately 24 hours against the conventional treatment time.

(4) Adhering totally-aromatic-liquid-crystal-polyester to the surfaces of substances, having high outgassing rates and thermal resistances, widens the field of applications thereof and makes it possible to construct seals in any shape.

We claim:

1. An electron microscope apparatus comprising:

an electron gun chamber in which an electron gun for emitting an electron beam is housed;

means for evacuating the electron gun chamber so as to maintain the inside thereof at an ultra-high vacuum on the order of $10^{-9}$ Torr and less; and valve means for connecting and disconnecting the inside of the electron gun chamber with and from the outside thereof, the valve means including a vacuum-tight seal made of a totally-aromatic-liquid-crystal-polyester and having a water absorptivity of 0.1% and less.

2. The electron microscope apparatus according to claim 1, wherein the vacuum-tight seal is provided with an outgassing rate of $2 \times 10^{-6}$ (Torr·l/sec/cm$^2$: at 200° C.) and less.

3. The electron microscope apparatus according to claim 1, wherein the vacuum-tight seal is made of totally-aromatic-liquid-crystal-polyester having an outgassing rate of $2 \times 10^{-6}$ (Torr·l/sec/cm$^2$: at 200° C.) and less.

4. An electron microscope apparatus comprising:

an electron gun chamber in which an electron gun for emitting an electron beam is house;

means for evacuating the electron gun chamber so as to maintain the inside thereof at an ultra-high vacuum on the order of $10^{-9}$ Torr and less; and valve means for connecting and disconnecting the inside of the electron gun chamber with and from the outside thereof, the valve means including a vacuum-tight seal made of a totally-aromatic-liquid-crystal-polyester and having an outgassing rate of $2 \times 10^{-6}$ (Torr·l/sec/cm$^2$: at 200° C.) and less.

5. An electron microscope apparatus comprising:

an electron gun chamber in which an electron gun for emitting an electron beam is housed;

means for evacuating the electron gun chamber so as to maintain the inside thereof at an ultra-high vacuum on the order of $10^{-9}$ Torr and less; and valve means for connecting and disconnecting the inside of the electron gun chamber with and from the outside thereof, the valve means including a vacuum-tight seal degassed by baking treatment, and the vacuum-tight seal comprising a substrate and a coat formed thereon made of a totally-aromatic-liquid-crystal-polyester having a water absorptivity of 0.1% and less.

6. The electron microscope apparatus according to claim 5, wherein the ultra-high vacuum is on an order of a degree of vacuum of $10^{-9}$ Torr and less and the coat is provided with a thermal deformation temperature higher than a temperature of the baking treatment thereof.

7. The electron microscope apparatus according to claim 6, wherein the coat is provided with an outgassing rate of $2 \times 10^{-6}$ (Torr·l/sec/cm$^2$: at 200° C.) and less.

8. The electron microscope apparatus according to claim 7, wherein the coat is made of totally-aromatic-liquid-crystal-polyester.

9. A vacuum-tight seal for use with an electron microscope apparatus comprising an electron gun chamber in which an electron gun for emitting an electron beam is housed, means for evacuating the electron gun chamber so as to maintain the inside thereof at an ultra-high vacuum on the order of $10^{-9}$ Torr and less, and valve means for connecting and disconnecting the inside of the electron gun chamber with and from the outside thereof, the valve means including the vacuum-tight seal; and the vacuum-tight seal comprising a substrate and a coat formed thereon substantially made only of a totally-aromatic-liquid-crystal-polyester having a water absorptivity of 0.1% and less and an outgassing rate of $2\times10^{-6}$ (Torr·l/sec/cm$^2$: at 200° C.) and less.

10. The electron microscope apparatus according to claim 1, wherein the vacuum-tight seal is made of totally-aromatic-liquid-crystal-polyester having an outgassing rate of $2\times10^{-6}$ (Torr·l/sec/cm$^2$: at 200° C.) and less.

11. The electron microscope apparatus according to claim 1, wherein the totally-aromatic-liquid-crystal-polyester has the following molecular structure formula:

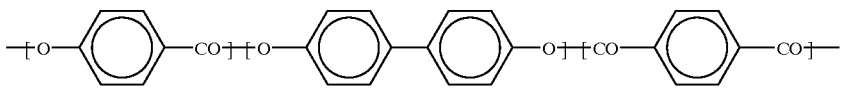

12. The electron microscope apparatus according to claim 1, wherein a deformation temperature of the vacuum-tight seal is at least 275° C.

13. The electron microscope apparatus according to claim 4, wherein the vacuum-tight seal comprises a totally-aromatic-liquid-crystal-polyester.

14. The electron microscope apparatus according to claim 13, wherein the totally-aromatic-liquid-crystal-polyester has the following molecular structure formula:

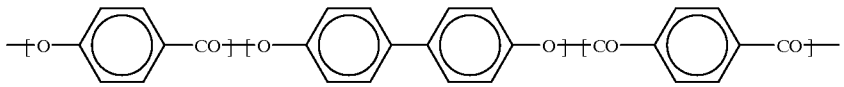

15. The electron microscope apparatus according to claim 4, wherein a deformation temperature of the vacuum-tight seal is at least 275° C.

16. The electron microscope apparatus according to claim 5, wherein the totally-aromatic-liquid-crystal-polyester has the following molecular structure formula:

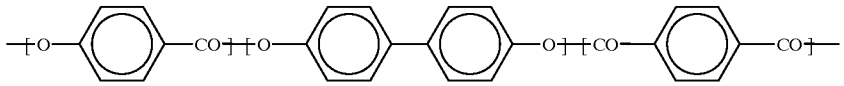

17. The electron microscope apparatus according to claim 5, wherein a deformation temperature of the vacuum-tight seal is at least 275° C.

18. The electron microscope apparatus according to claim 9, wherein the totally-aromatic-liquid-crystal-polyester has the following molecular structure formula:

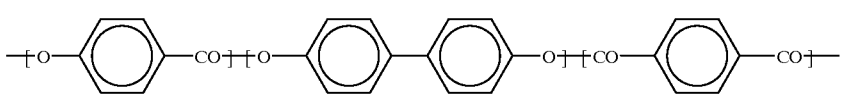

19. The electron microscope apparatus according to claim 9, wherein a deformation temperature of the vacuum-tight seal is at least 275° C.

20. The electron microscope apparatus according to claim 4, wherein the high molecular weight polymer has a water absorptivity of 0.1% or less.

21. The electron microscope apparatus according to claim 1, wherein said electron gun is of a field emission type.

22. The electron microscope apparatus according to claim 4, wherein said electron gun is of a field emission type.

23. The electron microscope apparatus according to claim 5, wherein said electron gun is of a field emission type.

24. The electron microscope apparatus according to claim 9, wherein said electron gun is of a field emission type.

* * * * *